S. S. WHITE.
DENTAL-ENGINE.

No. 171,750. Patented Jan. 4, 1876.

WITNESSES
E. E. Davidson
F. Stahl

Samuel S. White   INVENTOR

By his Attorney
Wm. D. Baldwin.

N. PETERS, PHOTO-LITHOGRAPHER, WASHINGTON, D. C.

UNITED STATES PATENT OFFICE.

SAMUEL S. WHITE, OF PHILADELPHIA, PENNSYLVANIA.

IMPROVEMENT IN DENTAL ENGINES.

Specification forming part of Letters Patent No. 171,750, dated January 4, 1876; application filed September 25, 1874.

CASE B½.

*To all whom it may concern:*

Be it known that I, SAMUEL STOCKTON WHITE, of Philadelphia, Pennsylvania, have invented certain new and useful Improvements in Dental Engines, of which the following is a specification:

My invention relates to the combination of a water-motor and a dental tool driven by it, with a dental chair.

The accompanying drawings represent my improvements as embodied in the best way now known to me.

Figure 1:
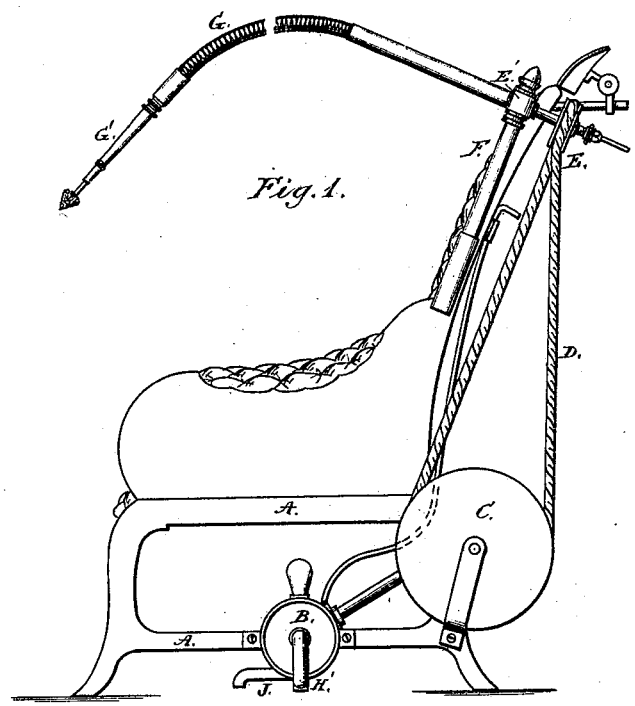
Figure 2:
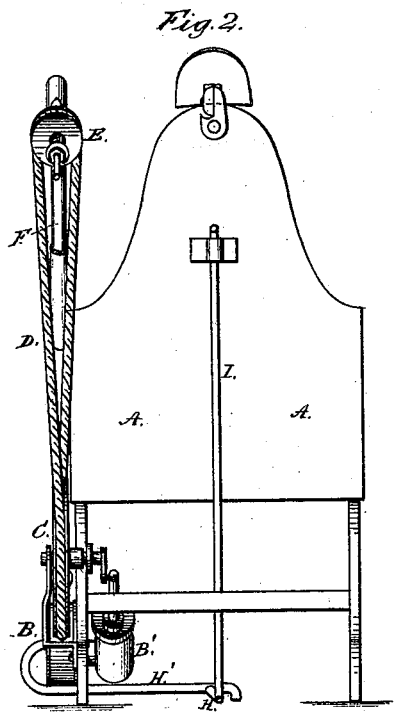

Figure 1 represents a side elevation of a dental chair, with my improvements applied thereto, and Fig. 2 a rear elevation of the same.

A dental chair, A, is shown as constructed with a stout frame, upon which a water-engine or turbine-wheel of well-known construction is mounted. In this instance the casing B of the water-wheel is shown as mounted upon the frame of the chair, as well as an oscillating engine, B', to illustrate either mode of application. The driving-wheel C of the engine, by means of a band or belt, D, drives a pulley, E, mounted in bearings, either in a suspended bracket or on a post or support, F, secured near to, or, as in this instance, upon, the chair. The pulley and shaft bearing E' is preferably made to turn or swivel upon this post or support. A jointed or flexible shaft rotated by this pulley is connected with the tool-holder of the hand-piece G' of a dental tool, in the usual well-known way. The shaft, in this instance, is composed of a flexible wire-coil, inclosed by a flexible sheath or casing, G, secured at one end to a sleeve on the turning bearing E', and at the other to the cover of the hand-piece.

The engine may be controlled by a throttle-valve, H, on the induction-pipe H', closed automatically by a spring, and opened by pressure, or it may be opened and closed positively by a valve-rod, I, secured to the chair. The water passes off by a suitable waste-pipe, J. The operator can thus readily control the engine and freely handle the tool without moving away from his chair.

I do not broadly claim operating a dental tool by means of a water-motor valve-regulating mechanism and tool mounted on the swinging bracket of a dental chair. Neither do I claim the flexible sheath, the wire shaft, or the hand-piece, as these form the subject-matter of Letters Patent granted to other parties.

I claim as of my own invention—

1. The combination, substantially as hereinbefore set forth, of a dental chair, a tubular sheath mounted thereon, and a dental tool, driven by a flexible shaft passing through the sheath.

2. The combination, substantially as hereinbefore set forth, of a dental chair, a water-motor mounted thereon, and belt connection driving a dental tool.

3. The dental engine, hereinbefore described, consisting of the combination of a water-motor, valve-regulating mechanism, driving-gearing, and a dental tool, all mounted directly upon the operator's chair itself, and constructed to operate in combination, substantially as hereinbefore set forth.

In testimony whereof I have hereunto subscribed my name.

SAMUEL S. WHITE.

Witnesses:
S. T. JONES,
JAS. B. WILLIAMS.